Patented Mar. 1, 1932

1,847,331

UNITED STATES PATENT OFFICE

JOYCE H. CROWELL, OF BUFFALO, NEW YORK, ASSIGNOR TO NATIONAL ANILINE & CHEMICAL CO., INC., OF NEW YORK, N. Y., A CORPORATION OF NEW YORK

PRODUCTION OF HALOGEN DERIVATIVES OF INDANTHRENE

No Drawing. Application filed June 17, 1924. Serial No. 720,565.

This invention relates to the manufacture of chlorinated derivatives of N-dihydro-1.2.2'.1'-anthraquinoneazine, and particularly to the production of monohalogen and dihalogen derivatives of indanthrene.

It is well known that N-dihydro-1.2.2'.1'-anthraquinoneazine, which is also known as indanthrene,

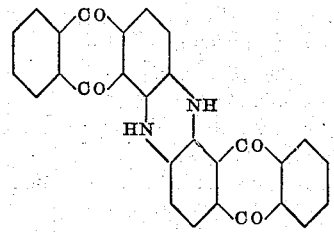

can be converted by oxidation into the corresponding azine, that is, into 1.2.2'.1'-anthraquinoneazine. In a similar manner monochlorindanthrene can be converted by oxidation to its corresponding azine, that is, to monochlor-1.2.2'.1'-anthraquinonazine.

It has been heretofore proposed to prepare monochlorindanthrene by treating 1.2.2'.1'-anthraquinoneazine with concentrated hydrochloric acid at boiling temperature, or at a temperature of 100° C. in an autoclave. Dichlorindanthrene has also been heretofore prepared by treating the azine obtained by the oxidation of monochlorindanthrene with boiling hydrochloric acid.

I have found that monochlorindanthrene can be produced by treating 1.2.2'.1'-anthraquinoneazine in the presence of sulfuric acid with hydrogen chloride or with a chloride which generates hydrogen chloride in the presence of sulfuric acid, such as sodium chloride, etc. In the same manner, monochlor-1.2.2'.1'-anthraquinoneazine upon treatment in the presence of sulfuric acid with a suitable chloride produces dichlorindanthrene. Further, in place of hydrogen chloride or other suitable chloride, hydrogen bromide or a suitable bromide can be employed in the present invention to produce brominated derivatives of indanthrene. The invention can be carried out at diminished, ordinary or superatmospheric pressures.

According to the present invention, a sulfuric acid solution of 1.2.2'.1'-anthraquinoneazine, or the monochlor- or monobrom-derivative thereof, is treated, preferably at ordinary pressure, with hydrogen chloride or hydrogen bromide, or with a chloride or bromide, such as sodium chloride or sodium bromide, etc., which is capable of generating hydrogen chloride or hydrogen bromide, respectively, when treated with sulfuric acid. The reaction is preferably carried out at a temperature of about 60°–80° C. but temperatures from about 50° to 130° C. can be employed. The resulting dyestuff is subsequently precipitated, collected, washed and, if desired, purified in any well-known and suitable manner.

The invention can also be carried out by oxidizing indanthrene, or chlor- or bromindanthrene, to the corresponding azine by means of a suitable oxidant and subsequently chlorinating, or brominating, and reducing the azine thus produced by treating it with a suitable chloride or bromide, said reactions being carried out in the presence of sulfuric acid.

The invention will be further illustrated by the following specific examples, but it will be understood that the invention is not limited thereto. The parts are by weight.

*Example 1.*—Dissolve 100 parts 1.2.2'.1-anthraquinoneazine (prepared in any manner, for example, by the oxidation of indanthrene in sulfuric acid solution by the addition thereto of sodium nitrate) in about 1500 parts of about 93 percent sulfuric acid, and to the solution at a temperature of about 50–60° C., while vigorously stirring, add gradually about 50–60 parts of sodium chloride over a period of about 1 to 4 hours, gradually bringing the temperature of the solution during this period to about 70–80° C. The reaction can be regarded as complete when a test sample of the solution on dilution with water gives a blue, and not a yellow or yellowish-brown, colored precipitate. If necessary, more sodium chloride can be added to complete the reaction. When the reaction is complete, the sulfuric acid solution is poured into about 10,000–15,000 parts water, and the precipitated dyestuff which separates out is collected and washed with hot water. If desired, it can be purified in any well-known manner. The dyestuff thus obtained is a chlorinated indanthrene and is comprised essentially of a monochlorindanthrene as shown by analysis and its properties. If, in this example, a sodium bromide is used in place of sodium chloride, then a monobromindanthrene can be obtained.

*Example 2.*—Dissolve 100 parts monochlor-1.2.2'.1'-anthraquinoneazine (prepared in any manner, for example, by treating monochlor-N-dihydro-1.2.2'.1'-anthraquinonazine in sulfuric acid solution with sodium nitrate) in about 2000 parts of about 95 percent strength sulfuric acid, and to the solution add sodium chloride in the manner described in Example 1. The dyestuff thus obtained is a dichlorindanthrene as shown by analysis and its properties. In this example, monobrom-1.2.2'.1'-anthraquinoneazine can be used in place of monochlor-1.2.2'.1'-anthraquinonazine, and sodium bromide in place of sodium chloride. A chlorobromindanthrene can be thus produced. If desired, the dihalogen-indanthrenes may be purified in any suitable manner, for example, by treating them with an alkaline sodium hydrosulfite solution, separating the sodium salt of the leuco-dye thus produced and oxidizing it in aqueous suspension by means of a current of air. The precipitated and purified dyestuff is subsequently collected in any suitable manner.

*Example 3.*—Dissolve 100 parts indanthrene in about 1300 parts of 93 percent sulfuric acid, and to this solution, while being stirred and maintained at a temperature of about 25—30° C., slowly add finely powdered sodium nitrate until a test sample on dilution with water gives a yellow to yellowish-red colored precipitate. Care should be taken not to add an amount of sodium nitrate in excess of that required to effect a complete oxidation to the azine. Ordinarily, about 15 to 21 parts of sodium nitrate will be required according to the purity of the indanthrene used. When oxidation to the azine is complete heat the solution to about 70°-80° C. and slowly add sodium chloride until a test sample of the solution on dilution with water produces a blue to a bluish-green precipitate. About 20 to 60 parts of sodium chloride may be required; but the addition of an excess of sodium chloride does no harm. When the reaction is complete, the sulfuric acid solution is poured into about 15000 parts water, the mixture heated to boiling and the precipitated dyestuff collected and washed with hot water. The dyestuff thus obtained contains about 7.2 percent chlorine and consists primarily of a monochlorindanthrene. It can be purified, if desired, in any suitable manner. In this example other oxidants can be used, such as nitric acid or a mixture of nitric and sulfuric acids. Also, in place of sodium chloride, sodium bromide can be used, in which case a monobrom-indanthrene can be obtained.

*Example 4.*—Dissolve 100 parts indanthrene in 2000 parts of well-stirred sulfuric acid of about 98 percent strength, and to this solution, maintained at a temperature of about 10°–20° C. while stirring, slowly add, in small quantities at a time, finely pulverized sodium nitrate until a test sample on dilution with water produces a yellow to yellowish-brown precipitate. This occurs when the indanthrene has been substantially completely transformed to the azine form. About 15–21 parts of sodium nitrate are usually required. Care should be exercised in not using more sodium nitrate than is necessary to complete the oxidation to the azine form. Then raise the temperature of the solution to about 60–80° C. and slowly add sodium chloride over a period of one to two hours or until a test sample on dilution with water produces a blue or greenish-blue precipitate. This occurs when the azine has been converted to monochlorindanthrene. It generally requires about 20–60 parts of sodium chloride. When the reaction is complete, blow a current of air through the solution to expel the hydrogen chloride present. Care should be taken not to add more sodium chloride than is necessary to effect the production of the monochlorindanthrene. Then cool the solution to about 20–25° C., and add finely pulverized sodium nitrate until a test sample on dilution with water gives a yellow to yellowish-brown precipitate due to the conversion of the chlorindanthrene into its azine form, care being taken not to employ an excess of sodium nitrate. When the reaction is complete, raise the temperature of the solution to about 75–80°C. and add sodium chloride, in small portions at a time, over a period of one or more hours, or until the azine has been substantially converted into dichlorindanthrene as shown by the reappearance of a blue to bluish-green precipitate of a tested sample. An excess of sodium chloride does no harm. When the reaction is complete, the mass is poured into a large quantity of water, the mixture boiled and the precipitated dichlorindanthrene collected and washed with hot water. If desired, it can be purified in any suitable manner, for example, as described in Example 2.

The proportions, conditions of operation etc., given in the above examples can be varied to a considerable extent. For example, the sulfuric acid employed can have a strength of about 90 to 100 percent, and the quantity used can vary from about ten to fifty, or over, parts for each part of indanthrene or chlorindanthrene employed. The quantity of sodium chloride or sodium bromide required to convert the azine to a halogenated dihydroazine will depend on the purity of the azine and on the amount of hydrogen chloride or bromide lost by escape from the reaction-mixture.

During the reduction and halogenation and before it is completed, the escape or loss of hydrogen halide from the solution should be prevented or minimized. Good agitation tends to decrease the amount of hydrogen halide lost and consequently the quantity of sodium halide employed. In the combined process where both a nitrate and a chloride is used, it is preferable that no considerable quantities of a nitrite and a chloride be present at the same time since aqua regia may be formed and it tends to produce a chlorinated azine which is not converted by hydrogen chloride to a dihydroazine. If such a chlorinated azine is produced it can be reduced to the dihydro form by the addition of ferrous sulfate to the sulfuric acid solution, or, after precipitation and filtration, by treating it with an alkaline hydrosulfite solution and subsequently oxidizing with air the product thus obtained.

It will thus be seen that the present invention permits the production of halogenated indanthrene, particularly monochlor-, monbrom-, dichlor-, dibrom-, and chlorobrom-indanthrene, or mixtures of the same, by the action of hydrogen halide in the presence of sulfuric acid on an anthraquinonazine or a halogen derivative thereof; and that the hydrogen halide necessary to carry out the reaction can be furnished by the addition of any suitable halide, such as sodium chloride, sodium bromide, etc., which is capable of generating hydrogen halide by the sulfuric acid medium. It is further seen that the invention permits the production of halogenated indanthrenes from indanthrene by means of an oxidation step followed by a reduction-halogenation step, and that these steps can be repeated, if desired, until a dihalogenated product is obtained. It is further seen that halogenated azines not reducible by hydrogen chloride or hydrogen bromide to a dihydro form can be readily reduced by means of ferrous sulfate or by an alkaline hydrosulfite solution.

In the claims, it is understood that the term "an anthraquinoneazine substance" refers to and includes 1.2.2'.1'-anthraquinoneazine and the monohalogen derivatives thereof. It is further understood that the term "halide" refers to and includes hydrogen chloride and hydrogen bromide and any chloride or bromide which generates hydrogen chloride or hydrogen bromide when treated with sulfuric acid, while the term "chloride" refers to and includes hydrogen chloride or any chloride of a metal which produces hydrogen chloride when treated with sulfuric acid.

I claim:

1. The process of producing a halogenated indanthrene which comprises treating a sulfuric acid solution of an anthraquinoneazine substance with a halide.

2. The process of producing a chlorinated indanthrene which comprises treating a sulfuric acid solution of an anthraquinoneazine substance with a chloride.

3. The process of producing a chlorindanthrene which comprises treating a sulfuric acid solution of an anthraquinoneazine substance with sodium chloride.

4. In the production of monochlor indanthrene, the process which comprises treating N-dihydro-1.2-1'.2'-anthraquinoneazine dissolved in sulfuric acid with sodium chloride at a temperature between 50° and 130° C.

5. The process of producing a halogenated indanthrene which comprises treating a solution of an anthraquinoneazine substance in sulfuric acid of ninety to one hundred per cent strength with a halide.

6. The process of producing a chlorinated indanthrene which comprises treating a sulfuric acid solution of an anthraquinoneazine substance with a chloride at a temperature of about 50°–130° C.

7. The process of producing a chlorine derivative of indanthrene, which comprises inducing a reaction at a temperature of about 60° to 80° C. between hydrogen chloride and an anthraquinonazine substance dissolved in concentrated sulfuric acid.

8. The process of producing a chlorinated indanthrene which comprises treating an anthraquinoneazine substance dissolved in sulfuric acid of ninety to one hundred per cent strength with an alkali metal chloride at a temperature below 130° C.

9. The process of producing a halogenated indanthrene, which comprises oxidizing indanthrene to its corresponding azine, then converting the azine to monohalogenated indanthrene by the action of hydrogen halide and subsequently oxidizing the monohalogenated indanthrene to its corresponding monohalogenated azine and finally converting the monohalogenated azine by means of a halide to a dihalogenated indanthrene, each and all of said steps being conducted in the presence of sulfuric acid as a solvent.

10. The process of producing a diahalogenated indanthrene which comprises oxidizing an indanthrene to its corresponding azine by means of a nitrate, then converting the azine thus produced to monohalogenated indanthrene by the action of hydrogen halide, subsequently oxidizing the monohalogenated indanthrene to its corresponding monohalogenated azine, and finally converting the monohalogenated azine, by means of hydrogen halide, to a dihalogenated indanthrene, each and all of said steps being conducted in the presence of sulfuric acid as a solvent.

11. The process of producing a chlorinated indanthrene, which comprises oxidizing indanthrene to its corresponding azine, then converting the azine to monochlorinated indanthrene by the action of a chloride and subsequently oxidizing the monochlorinated indanthrene to its corresponding monochlorinated azine and finally converting the monochlorinated azine by means of a chloride to a dichlorinated indanthrene, said steps being carried out in the presence of sulfuric acid as a solvent.

12. The process of producing a dichlorindanthrene which comprises oxidizing N-dihydro-1.2-1'2'-anthraquinoneazine into its corresponding azine by means of a nitrate, converting the azine thus produced to monochlorindanthrene by addition of sodium chloride, subsequently oxidizing the monochlorindanthrene to its corresponding azine by means of a nitrate, and finally converting the latter azine, by means of sodium chloride, to the dichlorindanthrene, each and all of said steps being conducted in the presence of sulfuric acid as a solvent.

13. The process of producing a halogenated indanthrene which comprises treating a dihydro anthraquinoneazine with substantially the theoretical quantity of an acid oxidizing agent in the presence of sulfuric acid to produce the corresponding anthraquinoneazine, and after oxidation is completed, treating the resulting mass with a halide to form a halogenated indanthrene.

14. The process of producing a halogenated indanthrene which comprises treating a dihydro anthraquinoneazine with substantially the theoretical quantity of a nitrate in the presence of sulfuric acid to produce the corresponding anthraquinoneazine, and after oxidation is completed, treating the resulting mass with a halide to form a halogenated indanthrene.

15. The process of producing a halogenated indanthrene which comprises treating a dihydro anthraquinoneazine with substantially the theoretical quantity of an acid oxidizing agent in the presence of sulfuric acid to produce the corresponding anthraquinoneazine, and after oxidation is completed, treating the resulting mass with hydrogen halide formed in situ to form a halogenated indanthrene.

16. In the process of producing a dichloranthraquinoneazine, the steps which comprise oxidizing the monochlorindanthrene by means of a nitrate in the presence of sulfuric acid to form the corresponding azine, and then adding to the reaction mass, which is substantially free from a nitrate, an alkali metal chloride to produce the corresponding dichlorazine.

17. In the process of producing coloring matters by treating a sulfuric acid solution of an anthraquinonazine substance with a halide, the step which comprises carrying out the reaction in the presence of sulfuric acid of about 90 to 100 percent strength.

18. In the process of producing a chlorinated indanthrene by treating a sulfuric acid solution of an anthraquinonazine substance with an alkali metal chloride, the step which comprises conducting the reaction in the presence of sulfuric acid of about 90 to 100 percent strength.

19. In the process of producing a halogenated indanthrene, the step which comprises treating a dihydroanthraquinonazine body with a nitrate in the presence of sulfuric acid, the amount of nitrate employed being sufficient but not in considerable excess of that required to oxidize the dihydro-anthraquinonazine body to the corresponding anthraquinonazine body.

20. The process of producing a halogenated indanthrene which comprises subjecting an anthraquinonazine substance in the absence of an oxidizing agent to the action of a halide in the presence of sulfuric acid.

21. The process of producing a chlorinated indanthrene which comprises subjecting an an anthraquinonazine substance in the absence of an oxidizing agent to the action of a haide in the presence of sulfuric acid.

22. The process of producing a chlorinated indanthrene which comprises subjecting 1 2.2'.1'-anthraquinonazine in the absence of an oxidant to the action of a chloride in the presence of sulfuric acid.

23. The process of producing a chlorinated indanthrene which comprises treating an anthraquinonazine substance in the substatial absence of a nitrate with a chloride in the presence of sulfuric acid.

24. The process of producing a halogenated indanthrene which comprises treating a dihydro-anthraquinonazine body with a nitrate to produce by oxidation the corresponding anthraquinonazine body and then treating the resulting antraquinonazine body with a halide to form a halogenated indanthrene, said steps being each carried to substantial completion in consecutive order in the presence of sulfuric acid and in such a manner that no considerable quantities of both nitrate and chloride are simultaneously present.

25. The process of producing a chlorinated indanthrene which comprises treating an N-dihydro-anthraquinonazine body first with sodium nitrate to produce by oxidation the corresponding anthraquinonazine body and at the substantial completion of the reaction treating the resulting reaction mixture with sodium chloride to form a chlorinated indanthrene, said steps being carried out in the presence of sulfuric acid and in such a manner that no considerable quantities of both nitrate and chloride are simultaneously present.

26. In the production of a halogenated indanthrene, the process which comprises treating indanthrene in sulfuric acid first with an alkali metal nitrate and then with an alkali metal halide, and subsequently treating the reaction mixture with ferrous sulfate.

27. In the production of a chlorinated indanthrene, the process which comprises inducing a reaction between hydrogen chloride and an anthraquinonazine substance dissolved in sulfuric acid.

28. In the production of a halogenated indanthrene, the process which comprises oxidizing an indanthrene, dissolved in sulfuric acid, to its corresponding azine, and subsequently treating the azine thus produced, and while still in the presence of sulfuric acid, with a halide selected from the group consisting of the chlorides and bromides, said halide being one which by interaction with sulfuric acid produces hydrogen halide.

29. In the production of a halogenated indanthrene, the process which comprises treating a sulfuric acid solution of 1.2.2'.1'-anthraquinoneazine with a halide selected from the group consisting of the chlorides and bromides, said halide being one which by interaction with sulfuric acid produces hydrogen halide.

30. In the production of a chlorinated indanthrene, the process which comprises dissolving N-dihydro-1.2.2'.1'-anthraquinoneazine in sulfuric acid containing nitric acid, and subjecting the resulting solution to the action of hydrogen chloride formed in the reaction mixture.

31. In the process of producing chloro-derivatives of N-dihydro-1.2.2'.1'-anthraquinoneazine, the step which comprises subjecting a sulfuric acid solution of an oxidized N-dihydro-1.2.2'.1'-anthraquinoneazine to the action of hydrogen chloride formed in the reaction mixture.

32. In a process of producing a chlorinated derivative of indanthrene, the steps which comprise treating a sulfuric acid solution of indanthrene first with an alkali metal nitrate and then with an alkali metal chloride.

33. The process of producing a dihalogenated indanthrene, which comprises treating a monohalogenated indanthrene in the azine form with a halide in the presence of sulfuric acid as a solvent.

34. The process of producing a dichlorinated indanthrene, which comprises treating a monochlor derivative of an anthraquinoneazine with a chloride in the presence of sulfuric acid as a solvent.

35. The process of producing dichlor-indanthrene, which comprises inducing a reaction between hydrogen chloride and monochlor-anthraquinoneazine in the presence of sulfuric acid as a solvent.

36. In the production of a halogenated indanthrene, the process which comprises subjecting an indanthrene in sulfuric acid first to the oxidizing action of a nitrate and then to the action of a halide, and subsequently treating the reaction mixture with ferrous sulfate.

In testimony whereof I affix my signature.

JOYCE H. CROWELL.

CERTIFICATE OF CORRECTION.

Patent No. 1,847,331.　　　　　　　　　　　　　Granted March 1, 1932, to

JOYCE H. CROWELL.

It is hereby certified that error appears in the printed specification of the above numbered patent requiring correction as follows: Page 1, line 80, for "1.2.2'.1-" read 1.2.2'.1'-; page 3, line 14, for "nitrite" read nitrate, line 28, for "indanthrene" read indanthrenes, and line 111, claim 9, for "manohalogenated" read monohalogenated; page 4, line 93, claim 21, for "haide" read chloride; and that the said Letters Patent should be read with these corrections therein that the same may conform to the record of the case in the Patent Office.

Signed and sealed this 12th day of April, A. D. 1932.

(Seal)　　　　　　　　　　　　　　　　　　　　M. J. Moore,
　　　　　　　　　　　　　　　　　　　　Acting Commissioner of Patents.